United States Patent [19]

Batzel et al.

[11] Patent Number: 5,508,434
[45] Date of Patent: Apr. 16, 1996

[54] PRODUCTION OF A POLYSUCCINIMIDE AND DERIVATIVES THEREOF IN THE PRESENCE OF A SULFUR-CONTAINING DEHYDRATING AGENT

[75] Inventors: Daniel A. Batzel, Skokie; James F. Kneller, LaGrange Park; Abdul R. Y. Meah, Justice, all of Ill.

[73] Assignee: Donlar Corporation, Bedford Park, Ill.

[21] Appl. No.: 313,770

[22] Filed: Sep. 28, 1994

[51] Int. Cl.$^6$ .................. C07D 207/40; C07D 207/325; C07D 403/06

[52] U.S. Cl. .................. 548/520; 528/328; 530/333; 548/545

[58] Field of Search ...................... 548/545, 520

[56] References Cited

U.S. PATENT DOCUMENTS

| | | | |
|---|---|---|---|
| 5,057,597 | 10/1991 | Koskan | 528/328 |
| 5,142,062 | 8/1992 | Knebel et al. | 548/545 |
| 5,221,733 | 6/1993 | Koskan et al. | 530/533 |
| 5,315,010 | 5/1994 | Koskan et al. | 548/520 |

OTHER PUBLICATIONS

Neri et al., J. Med. Chem. 16(8):893–897 (1973).

*Primary Examiner*—David B. Springer
*Attorney, Agent, or Firm*—Olson & Hierl, Ltd.

[57] ABSTRACT

Polysuccinimide of varying molecular weight has been prepared by heat polymerization of aspartic acid in the presence of a sulfur-containing dehydrating agent employing a variety of reaction mixtures and reaction conditions. Sulfur trioxide and heat decomposable sulfur trioxide precursor dehydrating agents are preferred for this purpose. The presence of an acid scavenger within the reaction mixture is desirable and leads to a relatively higher molecular weight polysuccinimide, while the absence of an acid scavenger results in a relatively lower molecular weight polysuccinimide.

41 Claims, No Drawings

PRODUCTION OF A POLYSUCCINIMIDE AND DERIVATIVES THEREOF IN THE PRESENCE OF A SULFUR-CONTAINING DEHYDRATING AGENT

FIELD OF THE INVENTION

This invention relates to the production of a polysuccinimide and derivatives thereof. More particularly, this invention relates to the production of a polysuccinimide or a derivative thereof by thermal polymerization.

BACKGROUND OF THE INVENTION

Polyanhydroaspartic acid (also known as polysuccinimide) is the key commercial precursor to polyaspartic acid, an increasingly important biodegradable water soluble polymer. The chemistry and process fundamentals of the preparation of polysuccinimide by the thermal condensation polymerization of aspartic acid are well established in the patent and journal literature. Illustrative of such methods are those described in U.S. Pat. No. 5,057,597, to Koskan and U.S. Pat. Nos. 5,315,010 and 5,221,733 to Koskan et al. The weight average molecular weights obtained by thermal condensation of aspartic acid by these methods are usually about 5000.

Additives to the aspartic acid monomer have also been employed to obtain higher weight average molecular weight polysuccinimide. The two most commonly used additives are concentrated phosphoric acid as reported in Neri, et. al., *J. Medicinal Chemistry*, 16, 893–897 (1973) and its cited references and phosphoric anhydride as reported by Knebel, et. al. U.S. Pat. No. 5,142,062. Detailed descriptions concerning the mechanism by which these phosphoric acid based additives work have not been widely published in the literature. Some references note their acidic abilities while others note their dehydrating abilities.

There are no commercial processes employing phosphoric acid based additives to prepare higher weight average molecular weight polysuccinimide for at least two reasons. First the cost of the reactants, phosphoric acid and its anhydride, are relatively high. Second, waste streams containing phosphate salts are damaging to the environment because phosphorous promotes algae blooms in lakes and rivers which deplete the level of oxygen necessary to sustain marine life.

The present invention provides an ecologically tolerable phosphoric acid free and economical manufacturing process for preparing high weight average molecular weight polysuccinimide which overcomes these disadvantages.

SUMMARY OF THE INVENTION

Methods of preparing polysuccinimide by the thermal polymerization of aspartic acid in the presence of a sulfur containing dehydrating agent to produce polysuccinimide having a relatively broad range of weight average molecular weights using additives that are less expensive and more environmentally acceptable than phosphoric acid based chemicals are contemplated. Preferably, a sulfur trioxide based system is employed to produce polysuccinimide over a relatively broad range of weight average molecular weights.

Surprisingly, it has been found that sulfur-containing dehydrating agents such as sulfur trioxide ($SO_3$), thermally decomposable sulfur trioxide precursors capable of generating sulfur trioxide and sulfonic acids, as well as mixtures thereof interact with aspartic acid to produce polysuccinimide.

More particularly, aspartic acid is thermally polymerized by thin layer methods in a hot reactant mixture with the sulfur-containing dehydrating agent at process temperatures in the range of about 140° C. to about 300° C. The weight average molecular weight and color of the resulting polysuccinimide can be varied by the selected molar ratios of reactants to one another in the reaction mixture, the temperature in the reactant zone and the time of the reaction.

Sulfur-containing dehydrating agents useful for present purposes include sulfur trioxide; a thermally decomposable sulfur trioxide precursor, such as sulfuric, fuming sulfuric, sulfamic and polysulfuric acids and inorganic as well as organic salts thereof; a coordination complex of sulfur trioxide and an amine such as a aliphatic or heterocyclic tertiary amine; a coordination complex of sulfur trioxide and an aprotic solvent; and a sulfonic acid such as methanesulfonic acid, toluenesulfonic acid, and the like, as well as a salt thereof.

The reaction mixture includes an acid scavenging additive, such as an inorganic or organic base, if a relatively higher molecular weight product is desired. Depending on the reactants, the inclusion of an acid scavenging additive beneficially produces the neutralized byproduct which can then regenerate the starting sulfur-containing dehydrating agent employed in the reaction.

The thermal polymerization can be carried out as a continuous, semi-continuous or batch thin layer process at atmospheric pressure or below. The polysuccinimide produced can be further hydrolyzed to polyaspartic acid, if desired.

The present inventive method thus overcomes problems associated with the above-indicated prior art phosphoric acid methods of making polysuccinimide. Advantageously, the present method provides an economical and ecologically tolerable process for obtaining polysuccinimide having a relatively wide range of molecular weights.

DETAILED DESCRIPTION OF THE INVENTION

The present thermal polymerization process produces relatively high yields of polysuccinimide having a relatively broad range of weight average molecular weight (Mw) of about 200 to about 20,000. Thin layer polymerization is the preferred polymerization technique as described herein.

Thus, in practicing the present inventive method, the Mw of the polysuccinimide produced can be controlled by the molar ratio of the reactants to one another in the reaction mixture, the reaction temperature and reaction time. Further, the color of the polysuccinimide produced can also be similarly controlled to obtain a reaction product that is substantially colorless or varying in degrees of color.

As presently practiced and preferred, the reaction mixture contains aspartic acid and a sulfur-containing dehydrating agent at molar ratios ranging from about 10:1 to about 1:2, preferably from about 4:1 to about 1:1. The dehydrating agent can be sulfur trioxide, a heat decomposable sulfur trioxide precursor, a coordination complex of sulfur trioxide and an aliphatic tertiary amine, a coordination complex of sulfur trioxide and a heterocyclic tertiary amine, a coordination complex of sulfur trioxide and an aprotic solvent, or a sulfonic acid or a salt thereof. An acid scavenging additive which is a base or which has an acid scavenging group can be included in the reaction mixture to neutralize acidic by-products and, in some cases, to regenerate the original sulfur-containing dehydrating agent.

While not intending to be bound to any one theory, it is believed that the process proceeds according to one or more of the following reaction mechanisms.

For example, one known heat decomposable sulfur trioxide precursor additive is sodium bisulfate which, upon heating, decomposes to sulfur trioxide according to Reaction No 1, below. See, for example, Remy, H. *Treatise on Inorganic Chemistry*, 1, 199, Elsevier Publishing Company (1956).

(1) $2NaHSO_4 \xrightarrow{heat} Na_2S_2O_7 + H_2O \xrightarrow{heat} Na_2SO_4 + SO_3$ Sulfur trioxide is well known for its dehydrating action. Sulfur trioxide is believed to facilitate the dehydration reaction between one of the two carboxylic acid groups on one aspartic acid molecule and the amine group of another aspartic acid molecule to form an amide linkage according to Reaction No. 2:

$SO_3 + R^1\text{—}COOH + H_2N\text{—}R^2 \rightarrow R^1\text{—}C(O)N(H)\text{—}R^2 + H_2SO_4$,
wherein $R^1 = \text{—}CH(NH_2)CH_2COOH$; and $R^2 = \text{—}CH(COOH)CH_2COOH$. (2)

Sulfur trioxide is also believed to facilitate the ring closure of the newly formed amide nitrogen in Reaction No. 2 with the other carboxylic acid group present to form an imide linkage, also a dehydration reaction according to Reaction No. 3:

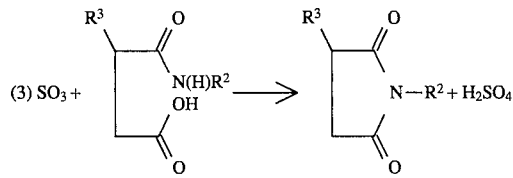

wherein $R^2$ is as defined in Reaction No. 2; and $R^3 = \text{—}NH_2$.

A surprising aspect of this discovery is the ability to control the Mw and Mn of the polysuccinimide produced in a variety of ways such as by the nature of the sulfur trioxide precursor additive employed, the molar concentration of the sulfur trioxide precursor additive, the reaction temperature and the reaction time as described.

One further factor to controlling the Mw and Mn is the inclusion of an acid scavenger additive in the reaction system. The acid scavenger additive can be formed in situ or can be separately added. It is believed that, when sulfur trioxide facilitates the dehydration step, it is then converted to sulfuric acid according to Reaction No. 4:

$SO_3 + H_2O \rightarrow H_2SO_4$ (4)

Sulfuric acid is a strong acid which is capable of decreasing the molecular weight of the polysuccinimide by breaking the newly formed amide bonds of the polymer (in effect, the reverse of Reaction No. 2). Amide bond degradation can be prevented by including an acid scavenger additive, such as a base (B) to neutralize the sulfuric acid formed according to Reaction No. 5:

$B + H_2SO_4 \rightarrow (BH)^+(HSO_4)^-$ (5)

In the case of sodium bisulfate in Reaction No. 1, the acid scavenger additive capable of neutralizing the sulfuric acid produced in Reactions Nos. 2, 3 and 4, for example, is sodium sulfate and is formed in situ. Sodium sulfate is believed to then proceed according to Reaction No. 6 to regenerate sodium bisulfate:

$H_2SO_4 + Na_2SO_4 \rightarrow 2\ NaHSO_4$ (6)

In the prior art, the role of a phosphoric acid based additive is believed to be that of a dehydrating reagent perhaps via phosphoric anhydride formation. The need for an acid scavenger additive in a phosphoric acid based system is not necessary, as phosphoric acid is a much weaker acid than sulfuric acid and thus does not lead to significant amide bond degradation. In the present sulfur trioxide system, the use of an acid scavenger additive to obtain relatively high molecular weight polymer is not considered disadvantageous because it can be formed in situ and is capable of regenerating the original $SO_3$ precursor additive. As shown in Reaction No. 6, for example, the resulting neutralized product is sodium bisulfate, which is the starting material for Reaction No. 1. Thus, it can be recovered for reuse in the manufacturing process.

An alternate mechanism especially when S-containing dehydrating agents are sulfonic acids may involve the formation of some highly reactive intermediate compound between the aspartic acid monomer and the sulfonic acid that when formed, leads to polymerization at low temperatures. One such intermediate may be a sulfonamide of aspartic acid such as $RSO_2\text{—}NH\text{—}CH(COOH)CH_2(COOH)$ Another such intermediate may be a sulfonic acid—aspartic acid mixed anhydride such as $H_2NCH(COOH)CH_2C(O)OSO_2R$.

Sulfur trioxide is preferably employed in its stabilized anhydride form, however, gaseous sulfur trioxide alone or admixed with an inert gas can be used as well. The stabilized anhydride form is commercially available under the designation SULFAN® from the General Chemical Division of Allied Chemical and Dye Corporation.

Sulfur trioxide precursors useful herein include thermally decomposable sulfur oxygen acids, such as sulfuric acid, fuming sulfuric acid, polysulfuric acids $[HO(SO_2O)_xH]$, sulfamic acid, and salts thereof having one or more counterions that can be an alkali metal, an alkaline earth metal, or a transition metal. Ammonium salts derived from ammonia or those derived from an organic base, e.g., an amine, can also be used for this purpose.

Salts can be anhydrous or hydrated, and preferably are a sulfate or a bisulfate. Exemplary such salts include, without being limited thereto, ammonium sulfate, ammonium bisulfate, sodium sulfate, sodium bisulfate, potassium sulfate, potassium bisulfate, the copper sulfates, ferrous sulfate, ferric sulfate, alums (aluminum ammonium sulfate, aluminum potassium sulfate, aluminum sulfate), ammonium sulfamate, urea sulfate, pyridinum sulfate, pyridinium bisulfate, and the like.

Further sulfur trioxide precursor additives useful herein include coordination complexes of sulfur trioxide and compounds having donating ligand groups, preferably complexes of aliphatic tertiary amines and heterocyclic tertiary amines. Exemplary coordination complexes include without being limited thereto: sulfur trioxide trimethylamine complex, sulfur trioxide pyridine complex, sulfur trioxide poly(4-vinylpyridine) complex, and sulfur trioxide trimethylphosphine complex.

Still further sulfur trioxide precursor additives useful herein include coordination complexes of sulfur trioxide and aprotic solvents. Exemplary solvent complexes include, without being limited thereto: sulfur trioxide dimethylformamide, sulfur trioxide dioxane, sulfur trioxide tetrahydrofuran, and the like.

Yet other suitable sulfur-containing dehydrating agents are alkyl—and arylsulfonic acids such as methanesulfonic acid, toluene sulfonic acid, and the like, as well as the salts thereof.

The inclusion of an acid scavenger additive, while optional, in contact with the reaction mixture was found desirable and generally led to the production of higher molecular weight polysuccinimide than that produced in the absence of an acid scavenger additive. The acid scavenging additive is preferably a base, such as an organic base or an inorganic base, or a compound which has an acid scavenging group derived therefrom. In some instances the acid scavenger can be formed in situ.

Suitable inorganic bases include but are not limited to alkali metal hydroxides, alkaline earth metal hydroxides, and ammonium hydroxide. Suitable organic bases include but are not limited to primary amines, secondary amines, and tertiary amines. Also suitable are polymeric amine bases. Particularly preferred are aliphatic tertiary amines and heterocyclic tertiary amines.

The Mw of the polysuccinimide produced is readily controllable with the described categories of reaction mixtures and reaction conditions by thin layer thermal polymerization processes in a temperature range of about 140° C. and about 300° C. A temperature range of about 160° C. and about 200° C. is preferred for producing substantially color-free polysuccinimide. However, where substantial color in the polysuccinimide is acceptable or tolerable, higher temperatures can be employed with a selected molar ratio of reactants. The inclusion of an acid scavenger additive within the reaction mixture is highly desirable and leads to higher molecular weight polysuccinimide while the absence of an acid scavenger additive generally produces a lower molecular weight product. Mw can also be controlled by the addition of boric acid.

The present process also provides for easy recovery of the thermal polymerization product, i.e., polysuccinimide, in relatively high yields in the range of about 30% to above about 90% by using a plate-type reactor.

Briefly described, in one thin layer polymerization method aspect, a reactant mixture as disclosed herein containing aspartic acid, prepared in any convenient manner, is passed through a hot reaction zone as a relatively thin layer on a plate, usually in intimate contact with a solid heat transfer surface, preferably not exceeding about 2 inches (about 5 centimeters) in thickness. The reactant mixture is maintained in the reaction zone at a temperature sufficient to initiate polymerization and to form a brittle solid, preferably in the range of about 140° C. to about 300° C., more preferably in the range of about 170° and about 180° C. for a time period in the range of about 15 minutes to about 5 hours, preferably in the range of about 30 minutes to about 2 hours. If desired, water may be added to the reactant mixture to facilitate blending to a substantially homogeneous mass. This can be done in any convenient manner, e.g., by spraying, or the like expedient.

The hot reaction zone can be a reactor such as a furnace or oven into which the reaction mixture is introduced as a relatively thin layer on a plate-type reactor, e.g., on trays, on a continuously moving conveyor belt (stainless steel or temperature-resistant composite), or in any other convenient manner, and heated sufficiently for polymerization to take place. Process pressure in the hot reaction zone can be atmospheric or sub-atmospheric. The atmosphere in the reactant can be ambient or inert, e.g., nitrogen, carbon dioxide, and the like.

Alternately, the reactor can be a rotary kiln dryer, screw-type extruder, fluidized bed, and the like.

Upon reaching polymerization temperatures, the reaction mass begins to foam, releasing polymerization by-products such as water. The thermal polymerization product obtained in the reaction zone is a brittle mass that can be readily recovered and comminuted to a desired particle size for use, or for further hydrolysis to polyaspartic acid or a salt thereof in a known manner.

The present process provides the required heat input to complete the polymerization to polysuccinimide quickly and in relatively inexpensive equipment. Full advantage is taken of the fact that the reaction mixture can be easily spread in a relatively thin layer on a heat transfer surface either as a powder, slurry or paste and then heated to form a melt of reactants. The moisture content is not critical for this purpose.

This thin layer of reactant provides sufficient surface for the transfer of the required heat without requiring mixing. In addition, as the polymerization reaction is completed, the thin layer of reactants becomes a expanded brittle porous mass that is easily removed from the heat transfer surface and ground into a free flowing powder that can be easily fed to a hydrolysis reactor.

As the temperature of the reactant mixture rises, the reactants may go through a melt stage. Thus, no effort needs to be made to agitate the reactants because it is not necessary to do so for heat transfer purposes. Sufficient heat transfer is provided by heating from both below the heat transfer surface and from above the reacting mass itself by radiant heat, conduction, convection or both. This can be most easily and economically achieved by using a continuous gas fired oven such as is used in baking or curing.

In one continuous process embodiment of the present invention, a reaction mixture of aspartic acid and sulfur trioxide or heat-decomposable sulfur trioxide source and optionally, an acid scavenging additive, are spread on a continuous belt or the like at the inlet to the oven. This reaction mixture then enters the reaction zone which is heated by gas firing or a similar expedient. The belt speed is adjusted so that the polymerization reaction to polysuccinimide is completed while the reactants are in the reaction zone. The obtained polysuccinimide product then enters a cooling zone where air or a water spray can be used to reduce the product temperature and to aid in the release of the product from the conveyor belt.

Produced polysuccinimide is removed from the conveyor belt and comminuted to a desired particle size in a device such as a grinder. If conversion to polyaspartic acid or a salt of polyaspartic acid is desired, the comminuted polysuccinimide is further hydrolyzed in a hydrolyzer unit using a base such as sodium hydroxide.

In addition to the foregoing continuous process embodiment, the present process can also be practiced by feeding the reaction mixture to trays on a continuous chain by which the trays are then moved through a hot oven. Cooling of the produced polysuccinimide can be accomplished by spraying water or air onto the trays at the downstream end of the reactor oven or furnace. The trays can be upended as they exit the oven and returned to the upstream part of the oven on the underside of the chain.

Additionally, the present process can be practiced in a batch oven by spreading the reaction mixture to the desired thickness as described above on trays. These trays are then placed on a rack and wheeled into a hot oven. The products are removed from the oven upon completion of the polymerization, the obtained polymer cooled, removed from the trays, and ground to a desired particle size.

In another embodiment, the aspartic acid-dehydrating agent admixture is combined with a particulate carrier material that can absorb or retain produced melt-like intermediates and the resulting reaction mass is then fluidized at reaction temperatures in a fluidized bed reactor.

The polysuccinimide produced in accordance with the present invention can be used per se, or it can be combined with an aqueous basic solution such as of ammonium hydroxide, sodium hydroxide, sodium carbonate, and the like, and be base hydrolyzed to produce salts of polyaspartic acid. Base hydrolysis can be carried out under a wide variety of conditions, but preferably is effected at a pH value of at least about 8 and higher, and at a temperature below about 80° C. While not a simple reaction, the hydrolysis generally follows an Arrhenius profile where the optimum temperature for the hydrolysis is at about 70° C. Acid hydrolysis of the product imide is also possible.

The following Examples further illustrate the invention. In each of the relatively larger scale Examples 1–3 and 63 unless stated otherwise, the following general procedure was employed and the formation of polysuccinimide reaction product thus produced, was confirmed by Infrared Spectroscopy (IR), collected and weighed and the yield calculated.

General Procedure: For Examples 1–3 and 63 a Kenmore convection oven was utilized with a heating coil at the bottom of the oven. A stainless steel pan having an area of about 1120 square centimeters ($cm^2$) was filled with the reaction mixture described in the following examples. The temperature of inside bottom surface of the pan containing the reaction mixture was measured using a specialized surface thermocouple probe (Omega Scientific, Model CO1, Type K). The pan was placed on a rack in the oven. The height of the rack above the heating coil was about 13 cm. The temperature of the oven was measured with a thermocouple probe (Type K) positioned above (about 3 cm) the surface of the contents in each pan. The pan was kept in the oven for a predetermined reaction time period. After this time period had been reached, the pan was removed from the oven, cooled to ambient room temperature, and the crude reaction products were crushed to a fine powder and weighed. In some instances the crude reaction product was analyzed for molecular weight by Size Exclusion Chromatography (SEC), and in other instances the crude reaction product was purified by hot water washings and the obtained water-insoluble portion was characterized by infrared spectroscopy to be polysuccinimide.

The so purified polysuccinimide was also analyzed for molecular weight by SEC. In preferred practice, the product (about 0.5 g) is combined with sodium hydroxide solution (1M; about 5.2 ml) and stirred to give a solution. A portion of this solution (0.5 grams) is combined with potassium phosphate dibasic solution (0.1M, about 5.5 g). The resultant admixture is filtered through a 0.45 μm filter (nylon) and subjected to instrumental analysis.

The instrumental setup was comprised of (1) an HPLC pump (Shimadzu model LC-10AD), (2) a mobile phase (0.05M $KH_2PO_4$ soln.) which carries the analyte (about 20 μL) at a rate of about 0.4 ml per min, (3) two size exclusion chromatography columns (SynChropak GPC 100, GPC 500), and (4) an ultraviolet (220 nm) detector. The instrument is standardized using sodium polyacrylate standards (Polysciences, Inc.) of narrow molecular weight distributions. Weight average molecular weight (Mw), number average (Mn) molecular weight and peak molecular weight (Mp) of the sodium polyacrylate standards used for calibration of the SEC instrument are well characterized by Polysciences, Inc. The Mw and Mn of the tested samples are obtained using an algorithm in the data handling system (Hitachi D-2520 GPC integrator).

EXAMPLE 1

Synthesis of Polysuccinimide by Thin Layer Polymerization of Aspartic Acid with Sulfur Trioxide Pyridine Complex L-Aspartic acid (Monsanto, 306.5 g, 2.3 mol) was mixed with sulfur trioxide pyridine complex (Aldrich, 107.45 g, 0.675 mol) in a mortar and the resulting free flowing powder was spread out as a relatively thin layer in a large (about 1120 $cm^2$) stainless steel pan. A thermocouple probe was placed between the powder and the bottom of the pan to measure the temperature of the reaction mixtures.

The pan was then placed in an oven which had been preheated to 170° C. The pan was kept in the oven for a total reaction time of 3 hours. During this time, the temperature of the reaction mixture inside the pan rose from an initial ambient room temperature of 23° C. to 160° C. in 15 minutes. The reaction temperature was then allowed to slowly rise to 170° C. for the remaining reaction time of 2.75 hrs. After this reaction time, the pan was removed from the oven and the reaction product allowed to cool to ambient room temperature.

A tan brittle foam was produced. The product was easily crushed to a powder in a mortar. The powder product was combined with about 6 liters (L) of water and then filtered. The filtered solid isolate was digested in boiling water (about 2 L) for about 0.3 hrs and then filtered. Next, the solid isolate on the filter funnel was washed with a final water rinse of about 1 L and dried at about 120° C., under reduced atmospheric pressure (about −70 KPa vacuum) for about 3 hrs.

A light tan powder was produced which was confirmed as polysuccinimide based on infrared spectroscopy (210.7 g, 2.17 mol, 94% yield). A portion (0.5 g) of the polysuccinimide produced was then hydrolyzed to sodium polyaspartate with aqueous sodium hydroxide solution (1M, 5.2 ml) to give a yellow solution. This solution was diluted to a solids concentration of about 1% with sodium phosphate monobasic solution (0.1M, pH 7 adjusted, 5.5 g).

The sodium polyaspartate produced was analyzed by Size Exclusion Chromatography (SEC) as described above as having a Mw of 12,127 and a Mn of 2,639.

EXAMPLE 2

Synthesis of Polysuccinimide by Thin Layer Polymerization of Aspartic Acid with Ammonium Bisulfate L-Aspartic acid (Pfizer, 300 g, 2.25 mol) was mixed with ammonium bisulfate (Aldrich, 86.39 g, 0.75 mol) in a mortar and the resulting mixture was spread out as a relatively thin layer in a large (about 1120 $cm^2$) stainless steel pan. A thermocouple probe was placed between the mixture and the bottom of the pan to measure the temperature of the reaction.

The pan was placed in an oven at ambient room temperature of about 23° C. The temperature in the oven was then gradually increased from ambient room temperature to 170°

C. over a period of one half hour. During this time the temperature of the reaction mixture inside the pan rose from about room temperature to 145° C. The temperature inside the oven was maintained at 170° C. for an additional 3 hours and the temperature of the reaction mixture in the pan slowly rose to the same temperature as the oven. After this reaction time the pan was removed from the oven and allowed to cool to ambient room temperature.

A very light tan brittle foam was produced. The product was easily crushed to a powder in a mortar. The powder product was weighed (309.4 g). Next, the powder product was combined with water (about 600 ml) and heated to boiling for about one half hour, cooled to about 40° C. and the resulting suspension decanted. The solid obtained was subjected to two additional hot water washings and then dried at 120° C. under reduced atmospheric pressure (about −70 Kpa vacuum) for 1.5 hrs.

An off-white powder was produced which was confirmed as polysuccinimide based on infrared spectroscopy (144 g, 1.48 mol, about 66% yield). A portion (0.5 g) of the product was hydrolyzed to sodium polyaspartate with aqueous sodium hydroxide solution (1M, 5.2 ml) to give a light yellow solution. A portion of the solution (0.5 g) was diluted to a solids concentration of about 1% with sodium phosphate monobasic solution (0.1M, pH 7 adjusted, 5.5 g).

The sodium polyaspartate produced was analyzed by SEC as described above to have a Mw of 4,224 and a Mn of 2,688.

EXAMPLE 3

Preparation of Polysuccinimide by Thin Layer Polymerization of Aspartic Acid Using Sodium Bisulfate L-Aspartic acid (Monsanto, 300.5 g, 2.26 mol) was mixed with sodium bisulfate monohydrate (Aldrich, 111.4 g, 0.81 mol) in a mortar to a free flowing powder. The resulting free flowing powder was combined with water (43 ml) to a paste which was then spread out as a thin layer in a large (about 1120 cm$^2$) stainless steel pan. A thermocouple probe was placed between the paste and the bottom of the pan to measure the temperature of the reaction mixture.

The pan was placed in an oven at ambient room temperature of 23° C. The oven was then heated to 200° C. over a period of about 40 minutes. During this time the temperature of the reaction mixture inside the pan rose from ambient to 163° C. The temperature of the oven was maintained at 195° C. to 200° C. for the next 1.25 hrs. During this time the temperature of the reaction mixture inside the pan rose to 195° C. After this reaction time, the pan was removed from the oven and the reaction product cooled to about ambient room temperature.

An off white brittle foam was produced. The product was easily crushed to a powder and weighed (322.8 g). The powder was combined with water (about 1500 ml) and digested for 0.5 hrs. at 60° C. The resulting suspension was filtered while still hot. The recovered solid isolate was washed with two additional similar hot (60° C.) water treatments and filtrations followed by a third washing with water at a temperature of about ambient room temperature and filtered again. The washed solid isolate was then dried at (about 120° C. under reduced atmospheric pressure (about −70 KPa vacuum) for 2 hrs.

An off-white powder was produced which was confirmed as polysuccinimide based on infrared B spectroscopy (189.5 g, 1.95 mol, about 86% yield). A portion (0.5g) of the product was hydrolyzed to sodium polyaspartate with aqueous sodium hydroxide solution (1M, 5.2 ml) to give a straw yellow solution. A portion of this solution (0.5 g) was diluted to a solids concentration of about 1% with sodium phosphate monobasic solution (0.1M, pH 7, about 5.5 g).

The sodium polyaspartate produced was analyzed by SEC as having a Mw of 3,945, and an Mn of 2,382.

EXAMPLES 4–62

Preparation of Polysuccinimide by Thin Layer Polymerization of Aspartic Acid Using Sulfur Trioxide Based Systems In Examples 4–62 the following general method was employed.

Reaction mixtures of L-Aspartic acid, with and without selected dehydrating or acid scavenging additives, were conveniently either prepared by mixing 10 the reactants in a mortar or by stirring the starting reactant materials together with a spatula. Each of the reaction mixtures was individually placed in separate test tubes. Each test tube was then placed in an oil bath set at about ambient room temperature. The temperatures of each of the oil baths were then increased to a preselected setpoint temperature depending on the type of reaction mixture employed and reaction temperature desired as indicated in Tables 1–4, below. Each of the tubes was allowed to remain at the setpoint temperatures for preselected periods of time. After the preselected time periods had expired, each of the tubes was removed from the baths and allowed to cool to ambient room temperature (about 23° C.) on the bench top.

The contents of each tube were visually inspected for indications that a phase change may have occurred during the heating (i.e. signs of melting, foaming, expansion, transparency, opacity). This observation is identified as a "soft or melt stage" notation on Tables 1–4.

Next, unless otherwise specified, water (about 14 ml) was added to each individual test tube containing the reaction product. The resulting aqueous mixtures were then each heated to boiling and maintained at boiling temperature for about 0.5 hrs. The boiled mixtures were cooled to ambient room temperature. Next the cooled mixtures were filtered and the solids (if any) were washed with two additional portions of water (about 14 ml each) and filtration treatments and then washed with methanol (about 14 ml) and filtered. Finally the solids were allowed to air dry overnight and then weighed.

The color of the isolated dry product was noted. Where successful reactions occurred, the isolated products were confirmed as being polysuccinimides by infrared spectroscopy. The molecular weight of the polysuccinimide produced was determined by conversion to sodium polyaspartate followed by SEC analysis using the methods described in Examples 1–3, and 63.

In some cases, the solids contained in the aforementioned water washings were analyzed by SEC as well.

TABLE 1

Control Examples, Examples of $H_2SO_4$ and $SO_3$, Examples of Sulfamic Acid and Examples of other $SO_3$ Precursor Additives With and Without Organic Acid Scavenger Groups.

| Ex. | Aspartic acid (g) | Additive; (g) I | Additive; (g) II | Molar Ratio Asp:I:II | Temp (°C); Time (h) | Amount Isolated (g) | Mw; Mn | Soft or Melt Stage (Yes or No) | Color of Product |
|---|---|---|---|---|---|---|---|---|---|
| 4 | 1.00 | none | none | NA | 170; 2.5 | 0.627 | 212; 194 | No | colorless |
| 5 | 2.05 | none | none | NA | 165–175; 1.5 | 1.72 | 216; 199 | No | colorless |
| 6 | 2.38 | none | none | NA | 240; 1 | 1.86 | 5882; 2851 | No | tan |
| 7 | 6.00 | $SO_3$ (SULFAN); 1.07 | none | 3.4:1 | 150–180; 2.8 | charred | not done | Yes | black |
| 8 | 2.03 | $H_2SO_4$ (fuming 30%); 0.540 | none | 7.6:1 ($SO_3$) | 160–180; 1.2 | 0.395 | 1471; 999 | Yes | colorless |
| 9 | 1.00 | $H_2SO_4$; 0.270 | none | 2.7:1 | 170; 2.5 | 0.382 | 2659; 1909 | Yes | off-white |
| 10 | 1.00 | $H_2SO_4$; 0.740 | none | 1:1 | 170; 2.5 | 0 | NA | Yes | amber; dark |
| 11 | 1.00 | Py; 0.196 | none | 3:1 | 170; 2.5 | 0.733 | 504; 201[a] | No | colorless |
| 12 | 1.00 | Py; 0.581 | none | 1:1 | 170; 2.5 | 0.784 | 212; 194 | No | colorless |
| 13 | 2.12 | $SO_3$ (SULFAN); 0.38 | Py; 0.42 | 3.3:1:1.1 | 150–180; 2.8 | 1.48 | 12,030; 3000 | Yes | brown |
| 14 | 1.22 | Py.$SO_3$; 0.331 | none | 4.4:1 | 165; 1.3 | 0.601 | 12,049; 4095 | Yes | colorless |
| 15 | 2.02 | Py.$SO_3$; 0.610 | none | 4:1 | 160; 1.5 | 2.17[b] | 9255; 1715[c] | Yes | colorless |
| 16 | 1.00 | Py; 0.442 | $H_2SO_4$; 0.260 | 2.8:2.1:1 | 170; 2.5 | 0.723 | 11,290; 4700 | Yes | pink-tan |
| 17 | 1.00 | Py; 1.19 | $H_2SO_4$; 0.751 | 1:2:1 | 170; 2.5 | 0.608 | 9497; 3887 | Yes | white-pink |
| 18 | 1.00 | Py; 0.251 | $H_2SO_4$; 0.279 | 2.7:1.1:1 | 170; 2.5 | 0.727 | 7942; 3847 | Yes | off-white |
| 19 | 1.00 | Py; 0.606 | $H_2SO_4$; 0.749 | 1:1:1 | 170; 2.5 | 0.695 | 6530; 3125 | Yes | off-white |
| 20 | 1.03 | $H_2NSO_3H$; 0.452 | none | 1.7:1 | 170; 2.25 | 0.345 | 3558; 2413 | yes | colorless |
| 21 | 1.20 | $H_2NSO_3H$; 0.525 | Py; 0.437 | 1.7:1:1 | 170; 2.25 | 0.823 | 9335; 4025 | yes | pink-tan |
| 22 | 1.00 | $H_2NSO_3H$; 0.250 | none | 2.9:1 | 170; 2.5 | 0.688 | 4121; 2375 | Yes | off-white |
| 23 | 1.00 | $H_2NSO_3H$; 0.733 | none | 1:1 | 170; 2.5 | 0.621 | 2815; 1837 | Yes | tan-brown |
| 24 | 1.00 | $Me_3N.SO_3$; 0.347 | none | 3:1 | 170; 2.5 | 0.790 | 17,440; 5253 | Yes | tan |
| 25 | 1.00 | $Me_3N.SO_3$; 1.08 | none | 1:1 | 170; 2.5 | 0.794 | 15,981; 4560 | Yes | tan |
| 26 | 1.00 | $DMF.SO_3$; 0.406 | none | 2.8:1 | 170; 2.5 | 0.637 | 6072; 3221 | Yes | tan |
| 27 | 1.00 | $DMF.SO_3$; 1.11 | none | 1:1 | 170; 2.5 | 0.723 | 5433; 2850 | Yes | tan-brown |
| 28 | 0.98 | Polyvinyl Py.$SO_3$[d]; 1.13 | none | 3:1 | 165–175; 1.5 | 1.53 | 5202; 2830 | No | lt. tan |
| 29 | 0.99 | Polyvinyl Py.$SO_3$[d]; 1.14 | none | 3:1 | 240; 1 | 0.704 | 5993; 2243 | Yes | black |
| 30 | 0.65 | Polyvinyl Py.$SO_3$[d]; 0.75 | $H_3BO_3$ 1.95 | 3:1 | 165–175; 1.5 | 0.868 | 2914; 1088 | Yes | off white |
| 31 | 0.66 | Polyvinyl Py.$SO_3$[d]; 0.76 | $H_3BO_3$ 1.98 | 3:1 | 240; 1 | 1.32 | 4227; 2302 | Yes | lt. brown |
| 32 | 0.788 | Polyvinyl Py[e]; 0.742 | $H_2SO_4$; 0.65 | 1:1.1:1.1 | 150–170; 1.5 | not meas. | 2622; 1559 | No | lt. tan |
| 33 | 0.778 | Polyvinyl Py[e]; 0.733 | $H_2SO_4$; 0.33 | 1.8:2:1 | 150–170; 1.5 | not meas. | 2986; 1548 | No | lt. tan |
| 34 | 0.695 | Polyvinyl Py[e]; 0.655 | $H_2SO_4$; 0.41 $H_3BO_3$; 1.38 | 1.3:1.4:1 | 150–170; 1.5 | not meas. | 1810; 873 | No | lt. tan |
| 35 | 1.05 | Polyvinyl Py[e] $H^+Cl^-$; 0.317 | none | 2.8:1 | 165–175; 1.5 | 0.899 | 1197; 256[a] | No | white |

[a]Bimodal molecular weight distribution.
[b]Wt. of crude isolate.
[c]MW of crude product.
[d]2.2 mmol $SO_3$/g.
[e]PvPy had proton capacity of 8.8 meq/g.

TABLE 2

Examples of $SO_3$ Precursor Additives With and Without Inorganic Acid Scavenger Groups.

| Ex. | Aspartic Acid (g) | Additive; (g) I | Additive; (g) II | Molar Ratio Asp:I:II | Temp (°C); Time (h) | Amount Isolated (g) | Mw; Mn | Soft or Melt Stage (Yes or No) | Color of Product |
|---|---|---|---|---|---|---|---|---|---|
| 36 | 1.00 | $NH_4HSO_4$; 0.249 | none | 3.5:1 | 170; 2.5 | 0.738 | 5185; 2856 | Yes | colorless |
| 37 | 1.00 | $NH_4HSO_4$; 0.848 | none | 1:1 | 170; 2.5 | 0.386 | 3392; 2205 | Yes | colorless |
| 38 | 0.966 | $NH_4HSO_4$; 0.284 | none | 2.9:1 | 240; 1 | 0.959 | 6489; 3050 | Yes | dk. tan |
| 39 | 1.00 | $(NH_4)_2SO_4$; 0.324 | none | 3:1 | 170; 2.5 | 0.649 | 222; 202 | No | colorless |
| 40 | 1.00 | $(NH_4)_2SO_4$; 1.00 | none | 1:1 | 170; 2.5 | 0.616 | 4032; 334[a] | No | colorless |
| 41 | 1.00 | $(NH_4)_2SO_4$; 0.359 | none | 2.8:1 | 240; 1.5 | 0.725 | 6067; 2714 | No | tan |
| 42 | 1.00 | $(NH_4)_2SO_4$; 1.00 | none | 1:1 | 240; 1.5 | 0.739 | 6224; 2756 | No | tan |
| 43 | 1.05 | $(NH_4)_2SO_4$; 0.372 | none | 2.8:1 | 240; 1 | 1.07 | 6513; 3042 | No | tan |
| 44 | 0.994 | $(NH_4)_2SO_4$; 0.356 | $H_2SO_4$; 0.243 | 3:1:1 | 165–175; 1.5 | 0.312 | 3582; 2279 | Yes | white |
| 45 | 1.07 | $(NH_4)_2SO_4$; 0.383 | $H_2SO_4$; 0.269 | 2.9:1.1:1 | 240; 1 | 0.552 | 5977; 2783 | Yes | dk. tan |
| 46 | 0.979 | $NaHSO_4.H_2O$; 0.381 | none | 2.7:1 | 165–175; 1.5 | 0.601 | 3920; 2485 | Yes | white |
| 47 | 0.993 | $NaHSO_4.H_2O$; 0.387 | none | 2.7:1 | 240; 1 | 0.823 | 9348; 3729 | Yes | lt. brown |
| 48 | 1.02 | $Na_2SO_4$; 0.367 | none | 3:1 | 165–175; 1.5 | 0.417 | 4591; 436[a] | No | white |
| 49 | 1.00 | $Na_2SO_4$; 0.368 | none | 2.9:1 | 240; 1 | 1.09 | 6245; 3196 | No | tan-pink |
| 50 | 0.972 | $Na_2SO_4$; 0.348 | $H_2SO_4$; 0.289 | 1:1:1.2 | 165–175; 1.5 | 0.467 | 2393; 1847 | Yes | yellow |
| 51 | 1.01 | $Na_2SO_4$; 0.374 | $H_2SO_4$; 0.258 | 2.9:1:1 | 240; 1 | 1.27 | 11,971; 4779 | Yes | brown |

TABLE 2-continued

Examples of SO₃ Precursor Additives With and Without Inorganic Acid Scavenger Groups.

| Ex. | Aspartic Acid (g) | Additive; (g) I | Additive; (g) II | Molar Ratio Asp:I:II | Temp (°C.); Time (h) | Amount Isolated (g) | Mw; Mn | Soft or Melt Stage (Yes or No) | Color of Product |
|---|---|---|---|---|---|---|---|---|---|

[a]Bimodal molecular weight distribution.

TABLE 3

Effect of Sulfites, Bisulfites, Other Sulfate Salts.

| Ex. | Aspartic Acid (g) | Additive; (g) I | Molar Ratio Asp:I | Time (h); Temp (°C.) | Amnt Isol. (g) | Mw; Mn | Melt or Soft Stage Obsrvd (Yes or No) | Color of Product |
|---|---|---|---|---|---|---|---|---|
| 52 | 1.53 | NaHSO₃; 0.399 | 3:1 | 165–175; 1.5 | 0.915 | 2313; 273[a] | No | white |
| 53 | 1.71 | NaHSO₃; 0.445 | 3:1 | 240; 1 | 0.391 | 6691; 3375 | Yes | sl. tan |
| 54 | 1.90 | Na₂SO₃; 0.599 | 3:1 | 165–175; 1.5 | 0.748 | 432; 197 | No | white |
| 55 | 1.89 | Na₂SO₃; 0.598 | 3:1 | 240; 1 | 0.068 | 3110; 1358[b] | Yes | tan |
| 56 | 1.86 | (NH₄)₂SO₃·H₂O; 0.680 | 3:1 | 165–175; 1.5 | 0.103 | 562; 377[b] | Yes | white |
| 57 | 1.82 | (NH₄)₂SO₃·H₂O; 0.666 | 3:1 | 240; 1 | 0.562 | 3498; 1841[c] | Yes | brown |
| 58 | 2.00 | MgSO₄; 0.603 | 3:1 | 165–175; 1.5 | 1.64 | 207; 193 | No | white |
| 59 | 1.89 | MgSO₄; 0.568 | 3:1 | 240; 1 | 1.51 | 6139; 2644 | No | tan |

[a]Trimodal molecular weight distribution.
[b]MW done on filtrate not on isolated solid.
[c]MW of filtrate gave Mw of 385, Mn 180.

TABLE 4

Sulfonic Acid Precursor Additives.

| Ex. | Aspartic Acid (g) | Additive; (g) I | Additive; (g) II | Molar Ratio Asp:I:II | Temp (°C.); Time (h) | Amount Isolated (g) | Mw; Mn | Soft or Melt Stage (Yes or No) | Color of Product |
|---|---|---|---|---|---|---|---|---|---|
| 60 | 1.0377 | CH₃SO₃H; 0.247 | none | 3:1 | 175; 1 | 0.259 | 2511; 2051 | Yes | White |
| 61 | 1.0186 | CH₃SO₃H; 0.241 | Py; 0.227 | 3.1:1:1.1 | 175; 1 | 0.418 | 4970; 3067 | Yes | Pink |
| 62 | 1.0168 | CH₃SO₃H; 0.850 | none | 1:1.2 | 175; 1 | 0 | NA | Yes | NA |

The details of the reaction conditions employed, ratio of reactants and results obtained for each individual reaction mixture in Examples 4–62 are given in Tables 1–4. For comparison purposes, the crude unwashed reaction product (not the washed product) produced by a reaction mixture of aspartic acid and pyridine sulfur trioxide complex was isolated and evaluated in Example 15. The weights of the isolated products in Examples 32–34 were not measured due to handling errors. In Examples 55 and 56, molecular weight data was gathered for the solids contained in the first filtrate product of the analysis workup described above. In Example 57 the Mw data is given for both the isolated solids and the solids contained in the filtrate.

Table 1 shows the reaction conditions and results for control reaction mixtures of heating L-aspartic acid with dehydrating additives in Examples 4–6. Shown in Table 1 for comparison are examples for the reaction mixtures heating L-aspartic acid without dehydrating additives but in the presence of the acid scavenging additive pyridine (Examples 11 and 12). Also shown in Table 1 for comparison is the example for the reaction mixture heating L-aspartic acid with the acid scavenger poly(4-vinyl pyridine hydrochloride (Polyvinyl Py H⁺Cl⁻) (Example 35).

Table 1 also shows reaction conditions and results for the reaction mixture of L-aspartic acid:

(a) with sulfur trioxide as the dehydrating additive with and without pyridine (Py) as the acid scavenging additive (Examples 7 and 13);

(b) with fuming sulfuric acid as the dehydrating additive (Example 8); and (c) with the following heat decomposable sulfur trioxide precursors as dehydrating additives:

(i) sulfuric acid and sulfamic acid with and without pyridine as the acid scavenger (Examples 9, 10, 16–23);

(ii) sulfuric acid with poly(4-vinyl pyridine) as the acid scavenger with and without boric acid as a buffer (Examples 32–34);

(iii) coordination complexes of sulfur trioxide and the nitrogen donor ligands pyridine and trimethylamine (Me=CH₃) (Examples 14, 15, 24, 25);

(iv) coordination complexes of sulfur trioxide and the polar aprotic solvent dimethylformamide (DMF) as a donor ligand (Examples 26 and 27); and (v) coordination complexes of sulfur trioxide and the polymeric nitrogen-polydentate-ligand poly(4-vinyl pyridine (polyvinyl Py) with and without boric acid as a buffer (Examples 28–31).

Table 2 shows the reaction conditions and results for reaction mixtures of aspartic acid and the following heat decomposable sulfur trioxide precursor dehydrating additives having inorganic acid scavenging groups: ammonium bisulfate, sodium bisulfate, ammonium sulfate and sodium sulfate, with and without added sulfuric acid present. (Examples 36–51).

Table 3 shows the reaction conditions and results for reaction mixtures of aspartic acid and the following additives: sodium bisulfite, sodium sulfite, ammonium bisulfite, and magnesium sulfate (Examples 52– 59).

Table 4 shows the reaction conditions and results for reaction mixtures of aspartic acid and the sulfur-containing dehydrating agent, methanesulfonic acid, with and without pyridine as acid scavenging additive (Examples 60–62).

Some of the results are discussed briefly below. For convenience and purposes of discussion of molecular weight, references are made to weight average molecular weight (Mw).

As shown in Table 1 for the control Examples 4 and 5, heat polymerizing aspartic acid at about 170° C. for up to about 2.5 hrs. effected little or no formation of polysuccinimide. On the other hand, heat polymerizing aspartic acid at about 240° C. for about 1 hr (Example 6) produced a higher molecular weight polysuccinimide of Mw of about 5800. This result is in accordance with the molecular weights reported in the literature for thermal condensation polymerization reactions of aspartic acid alone.

In Example 7, heating a reaction mixture of aspartic acid and stabilized sulfur trioxide (SULFAN®) at about 150° C. resulted in charring. However, when pyridine was included in the reaction mixture (Example 13), a polysuccinimide of high molecular weight (Mw above 12,000) was produced. Reaction mixtures of pyridine and aspartic acid, without sulfur trioxide, effected little or no formation of polysuccinimide (Examples 11 and 12).

Surprisingly, heating aspartic acid in fuming (about 30% $SO_3$) sulfuric acid or concentrated sulfuric acid produced a white colored polysuccinimide (Examples 8 and 9) of intermediate molecular weight (above about 1,000 and below about 3,000 Mw) when employed, respectively, in substoichiometric molar ratio amounts relative to aspartic acid of about 7.6:1 (based on sulfur trioxide) and about 2.7:1. When the molar ratio of aspartic acid and sulfuric acid was increased to 1 to 1 (Example 10) no polysuccinimide is formed.

Sulfur trioxide precursor additives which were coordination complexes of sulfur trioxide also produced relatively high molecular weight polysuccinimide. These are advantageous because such complexes are usually easier to handle than sulfur trioxide alone. Examples 14 and 15 are examples where an aromatic amine, such as pyridine, was the coordinating ligand. In Examples 24 and 25 the tertiary aliphatic amine, trimethylamine, was employed as the ligand. Examples 26 and 27 employ the use of an amide grouping of the aprotic solvent dimethylformamide (DMF) as the donor group in this coordinating ligand.

Reaction mixtures which were combinations of aspartic acid, pyridine and sulfuric acid of varying molar ratio stoichiometries produced polysuccinimides of various Mw as seen in Examples 16–19. It is believed that a pyridinium sulfate salt is formed when the molar ratio of pyridine to sulfuric acid is about 2:1 (Examples 16 and 17) and that a pyridinium bisulfate is formed when the molar ratios of pyridine to sulfuric acid is about 1:1 (Examples 18 and 19).

Reaction mixtures of aspartic acid and sulfamic acid heated to about 170° C. also produced polysuccinimide (Examples 20–23). Sulfamic acid is a covalent molecule at room temperature. However it is isoelectronic with the coordination complex, $H_3N.SO_3$, which is believed to form at higher temperatures. Interestingly, when sulfamic acid was combined with pyridine (Example 21) the Mw of the polysuccinimide increased from a Mw of about 3558 (Example 20) to a Mw of about 9335 (Example 21).

In Examples 28–35, the polymeric base polyvinylpyridine was employed under various reaction conditions. In Example 28 (reaction temperature of about 170° C.) and Example 29 (reaction temperature of about 240° C.), the reaction mixture of aspartic acid and sulfur trioxide poly(4-vinylpyridine) complex produced polysuccinimide having a Mw of about 5202 and about 5993 respectively. In Example 28, the Mw of the polysuccinimide produced was substantially higher than that of heat polymerized aspartic acid at about 170° C. (control Examples 4 and 5). In Example 29, the Mw of the polysuccinimide produced was approximately equivalent to that of heat polymerized aspartic acid produced at about 240° C. (control Example 6).

Examples 30 and 31 further illustrate the ability of the method of this invention to control the Mw of the resulting polysuccinimide by including boric acid in the reaction mixture containing coordination complex of sulfur trioxide. Boric acid is believed to act as a buffer in this instance.

In Examples 32 and 33, poly(4-vinylpyridine) in combination with sulfuric acid and reacted with aspartic acid produced a polysuccinimide of intermediate Mw. The inclusion of boric acid (Example 34) to such a reaction mixture again illustrated a further level of Mw control.

In the reaction mixture in Example 35, the hydrochloride salt of poly(4-vinylpyridine) also produced polysuccinimide but in relatively low yields as illustrated by its bimodal molecular weight distribution which includes a monomer peak as detected by SEC and a similarly detected polysuccinimide peak. The calculated Mw is the proportional weight average of the two peaks. In the present Examples showing a bimodal distribution, the Mw is relatively small. In Example 35, it is believed that the hydrochloride acid salt is probably not acting as a dehydrating additive, nor as an effective acid scavenger.

The use of a polymeric base, such as poly(4-vinylpyridine), is advantageous, because the base is insoluble and can be easily recovered and recycled for reuse.

Table 2 shows the results for examples of sulfur trioxide precursor additives which have inorganic acid scavenger groups. Examples 36 and 37 show that at a reaction temperature of about 170° C., when ammonium bisulfate was employed, polysuccinimide was produced having significantly higher Mw than that obtained in the comparative control examples (Examples 4 and 5). However, the difference between the Mw of polysuccinimide prepared at a reaction temperature of about 240° C. employing ammonium bisulfate (Example 38) and that of the comparative control (Example 6) was smaller.

The use of ammonium sulfate at a reaction temperature of about 170° C. (Examples 39 and 40) to 10 prepare polysuccinimide did not substantially improve the Mw of the polysuccinimide produced over that of the control Examples 4 and 5. However, as seen in Example 40, there was some indication that at least some high molecular weight polysuccinimide was produced (although the molecular weight distribution was bimodal). Increasing the reaction temperature to about 240° C. in reaction mixtures of aspartic acid and ammonium sulfate (Examples 41, 42, and 43) produced only a very small increase in Mw over that of the comparative control (Example 6).

Interestingly, the inclusion of sulfuric acid in the reaction mixture of aspartic acid and ammonium sulfate (Example 44) produced a polysuccinimide having a substantially improved Mw over that of the comparative controls at a reaction temperature of about 170° C. in Examples 4 and 5. However, at a reaction temperature of about 240° C. (Example 45) the Mw of the polysuccinimide produced was substantially the same as that of the comparative control in Example 6.

When the reaction mixture of aspartic acid and sodium bisulfate was heated to about 170° C. in Example 46, polysuccinimide of relatively high Mw (about 3920) was produced and at higher temperatures of about 240° C., high molecular weight polysuccinimide of Mw of about 9348, was produced in Example 47.

The reaction mixture of aspartic acid and sodium sulfate at a reaction temperature of about 170° C. in Example 48 produced polysuccinimide of higher Mw than that which was obtained with a reaction mixture of aspartic acid and ammonium sulfate in Example 39 but of only slightly higher Mn. At higher reaction temperatures, however, there was substantially no observable differences between the use of either sodium sulfate or ammonium sulfate, based on the Mw of the 10 polysuccinimide produced. On the other hand, there was substantial improvement in the Mw of polysuccinimide produced from a reaction mixture of aspartic acid, sodium sulfate and sulfuric acid. As seen in Example 51 polysuccinimide of a Mw as high as about 11,971 was produced at a reaction temperature of about 240° C.

Table 3 shows the reaction conditions and results for various reaction mixtures of aspartic acid and heat decomposable sulfur dioxide precursor additives which are sulfite, bisulfite salts having a counterion that is either an alkali metal, or is derived from ammonia, employed as dehydrating agents. Table 3 also shows the effect of desiccant magnesium sulfate, a compound known to decompose to $SO_3$ at temperatures above 250° C. The molecular weight of polysuccinimide produced in Examples 52, 54, 56 and 58 using sulfites or bisulfites or magnesium sulfate at a reaction temperature of about 170° C. was generally much lower than those obtained with the bisulfate salts discussed above.

The sulfite and bisulfite dehydrating additives would be expected to release $SO_2$ upon heating. $SO_2$ is a weaker dehydrating agent than $SO_3$. This suggests that perhaps the released $SO_2$ would need to be converted to $SO_3$ by introducing $O_2$ or other oxidizing agents into the system during heating.

The low molecular weight obtained using the desiccant magnesium sulfate in Example 58 suggests that the dehydration reaction is more than a mere desiccation and thus substantiates further the role of $SO_3$ in the process of the present invention.

The results at reaction temperatures of about 240° C. shown in Examples 53, 55, 57 and 59 produced polysuccinimide of roughly equivalent or lower Mw than that of the comparative control Example 6.

Table 4 shows the conditions of reaction and results for polysuccinimide prepared from reaction mixtures of aspartic acid and methanesulfonic acid as the sulfur containing dehydrating agent, with and without pyridine as the acid scavenging additive.

As seen in Table 4, methanesulfonic acid promotes the polymerization of aspartic acid to polysuccinimide (Examples 60 and 61) at a reaction temperature of about 175° C. whereas the comparative controls in this general temperature range (Examples 4 and 5) produced substantially little or no polysuccinimide.

The mechanism for this effect is not clear. It is believed, that methanesulfonic acid may promote polymerization through the formation of $SO_3$ by thermal decomposition. Alternatively, the methanesulfonic acid may promote polymerization through some intermediate capable of activating its terminal amine groups (e.g., by formation of a sulfonamide) or terminal carboxylic acid groups (e.g., by formation of sulfonate mixed anhydrides).

The addition of a base, such as pyridine, to the reaction mixture of aspartic acid and methanesulfonic acid in Example 61 produced a polysuccinimide of higher Mw than did the reaction mixture without pyridine in Example 60. This is in accordance with previous examples of reaction mixtures employing sulfuric acid dehydrating additive with and without the inclusion of a base as acid scavenging additive.

The reaction mixture at a molar ratio of aspartic acid to methanesulfonic acid of about 1:1.2 produced no polysuccinimide (Example 62), unlike a molar ratio of about 3:1 where polysuccinimide was produced (Example 60). These results also are in accordance with the results for reaction mixtures using sulfuric acid employing substantially similar molar ratios (Examples 9 and 10).

EXAMPLE 63

Preparation of Polysuccinimide

This example illustrates the manufacture of polysuccinimide with sulfuric acid dehydrating additive on a relatively larger scale.

L-Aspartic acid (Monsanto, 300.4 g, 2.26 mol) was mixed with sulfuric acid (Fisher, 95–98%, 81.52 g, 0.79–0.818 mol) in a hand agitated ball mill and the resulting powder was spread out as a relatively thin layer in a large (about 1120 $cm^2$) stainless steel pan. Water (44 g) was sprayed uniformly onto the surface of the powder to produce a paste.

A thermocouple probe was placed between the paste and the bottom of the pan to measure the temperature of the reaction mixture. The pan was placed in an oven at ambient room temperature of 23° C. The oven was then heated to about 185° C. over a period of 0.4 hrs. During this time the temperature of the reaction mixture inside the pan rose from ambient room temperature to 145° C.

The temperature of the oven was maintained at 185° and 190° C. for the next 1.75 hrs. During this time the reaction temperature of the reaction mixture inside the pan rose to 193° C. After this time the pan was removed from the oven and cooled to about ambient room temperature.

A yellow brittle foam product was obtained. The product was easily crushed to a powder and weighed (312.6 g). The powder was combined with water (2 L) and stirred for about 0.5 hrs. at about 80° C. to form a suspension. The suspension was then cooled to about ambient room temperature and filtered (Whatman #2). The solid isolate was recovered and was combined in water (1.2 L) to again provide a suspension. Sodium carbonate (14 g, 0.132 mol) was slowly added to the suspension to produce a colorless suspension having a pH of about 5.2.

The colorless suspension was then heated with stirring for about 0.5 hrs. at about 80° C. and the resulting heated suspension was then cooled to ambient room temperature. The cooled suspension was filtered (Whatman #2) and the solid isolate was dried at 120° C. under reduced atmospheric pressure (at about −70 KPa vacuum).

An off-white powder was produced which was confirmed as polysuccinimide based on infrared spectroscopy (73.24 g, 0.754 mol, 33% yield). A portion (0.5 g) of the product was hydrolyzed to sodium polyaspartate with aqueous sodium hydroxide solution (1M, 5.2 ml) to give a straw yellow solution. A portion of the solution (0.5 g) was diluted to a solids concentration of about 1% with sodium phosphate monobasic solution (0.1M, about pH 7 adjusted, about 5.5 g). The sodium polyaspartate was analyzed by SEC as having a Mw of 2,395 and a Mn of 1.953.

Standards used for calibration of the SEC instrument are well characterized sodium polyacrylates of known, Mw, Mp, and Mn values obtained from Polysciences, Inc.

Based on an analysis of the water washing from the workup of this material, a lower molecular weight reaction product was also produced. A portion of the filtrate obtained from the first washing of the crude reaction product above (2 g) was combined with sodium phosphate monobasic solution (0.1M, pH 7 adjusted, 6 g) and a few drops of aqueous sodium hydroxide solution about (5M) to provide a solution having a pH of 5. The solution was analyzed by SEC and found to contain a low molecular weight oligomer of uncertain structure having a Mw of about 402 and Mn of about 292.

It is not now known whether this material is a water soluble polysuccinimide oligomer or polyaspartic acid oligomer. These oligomers may be useful in corrosion inhibition, for example, and can be readily isolated by evaporating the water. Alternatively these oligomers could be further subjected to polymerization conditions in the recycle loop of, for example, a continuous process.

This Example further demonstrates the ability to control molecular weight during manufacture on a larger scale by practicing the method of this invention.

What is claimed is:

1. A method for preparing a polysuccinimide which comprises the steps of:
   (a) combining solid aspartic acid with a sulfur-containing dehydrating agent selected from the group consisting of sulfur trioxide, sulfur trioxide precursors, sulfur oxygen acids and salts thereof, and compounds containing a sulfonic acid group, to produce a reaction mixture;
   (b) polymerizing said reaction mixture by heating to a temperature sufficient to initiate polymerization; and
   (c) maintaining said polymerization temperature for a time period sufficient to effect polymerization of said aspartic acid to polysuccinimide.

2. The method of claim 1 further including the step of cooling the polysuccinimide to ambient room temperature.

3. The method of claim 2 further including the step of hydrolyzing the polysuccinimide to polyaspartic acid or salt thereof.

4. The method of claim 1 wherein the dehydrating agent is sulfur trioxide.

5. The method of claim 1 wherein the sulfur-containing dehydrating agent is a thermally decomposable sulfur trioxide precursor which releases sulfur trioxide when heated.

6. The method of claim 5 wherein the sulfur trioxide precursor is a sulfur oxygen acid selected from the group consisting of sulfuric acid, fuming sulfuric acid, sulfamic acid, polysulfuric acid, and salts thereof.

7. The method of claim 1, wherein the sulfur-containing dehydrating agent is a sulfonic acid or a salt thereof.

8. The method of claim 7, wherein the sulfonic acid is methanesulfonic acid.

9. The method of claim 7, wherein the sulfonic acid is toluenesulfonic acid.

10. The method of claim 1 wherein the sulfur-containing dehydrating agent is a salt selected from the group consisting of a bisulfate and a sulfate.

11. The method of claim 10 wherein the salt has a counterion selected from the group consisting of alkali metal, alkaline earth metal, a transition metal, and ammonium.

12. The method of claim 10 wherein the salt is derived from an organic nitrogen base.

13. The method of claim 1 wherein the reaction temperature in steps (b) and (c) is in the range of about 140° C. to about 300° C.

14. The method of claim 1 wherein the reaction temperature in steps (b) and (c) is in the range of about 160° C. to about 200° C.

15. The method of claim 1 wherein the reaction temperature in steps (b) and (c) is in the range of about 170° C. to about 180° C.

16. The method of claim 1 wherein the reaction mixture further includes an acid scavenging additive.

17. The method of claim 16 wherein the acid scavenging additive is a salt-forming base.

18. The method of claim 17 wherein the base is an inorganic base selected from the group consisting of an alkali metal hydroxide, an alkaline earth metal hydroxide, and ammonium hydroxide.

19. The method of claim 17, wherein the base is an organic base selected from the group consisting of a primary amine, a secondary amine and a tertiary amine.

20. The method of claim 17, wherein the base is an aliphatic tertiary amine.

21. The method of claim 17 wherein the base is a heterocyclic tertiary amine.

22. The method of claim 17 wherein the base is a polymeric amine.

23. A process for the production of polysuccinimide which comprises the steps of depositing a reaction mixture comprising aspartic acid and a sulfur-containing dehydrating agent selected from the group consisting of sulfur trioxide, sulfur trioxide precursors, sulfur oxygen acids and salts thereof, and compounds containing a sulfonic acid group, onto a plate type reactor, passing the deposited reaction mixture through a hot reaction zone at a temperature sufficient to initiate polymerization and for a time period sufficient to form a brittle solid that includes a thermally polymerized polysuccinimide, and thereafter recovering said thermally polymerized polysuccinimide from said reactor.

24. The process of claim 23, wherein the reaction zone is at a reaction temperature in the range of about 140° C. to about 300° C., the reaction mixture is deposited as a layer no more than about two inches thick, and the deposited layer of said reaction mixture is present in the hot reaction zone for a time period in the range of about 15 minutes to about 5 hours.

25. The process of claim 23, wherein said reaction temperature is in the range of about 160° C. to about 200° C.

26. The process of claim 23, wherein said dehydrating agent is sulfur trioxide.

27. The process of claim 23 wherein said dehydrating agent is a thermally decomposable sulfur trioxide precursor which releases sulfur trioxide when heated.

28. The process of claim 27, wherein the sulfur trioxide precursor is a sulfur oxygen acid selected from the group consisting of sulfuric acid, fuming sulfuric acid, sulfamic acid, polysulfuric acid and a salt thereof.

29. The process of claim 27, wherein the thermally decomposable sulfur trioxide precursor is a complex of sulfur trioxide and an amine.

30. The process of claim 23, wherein the sulfur-containing dehydrating agent is a sulfonic acid or a salt thereof.

31. The process of claim 30, wherein the sulfonic acid is methanesulfonic acid.

32. The process of claim 30, wherein the sulfonic acid is toluenesulfonic acid.

33. The process of claim 27, wherein the thermally decomposable sulfur trioxide precursor is a complex of sulfur trioxide and an aprotic solvent.

34. The process of claim 24, wherein the reaction mixture further includes an acid scavenging additive.

35. The process of claim 23, wherein the reaction mixture further includes boric acid.

36. The process of claim 23 wherein water is added to the reaction mixture.

37. The process of claim 36 wherein the water addition is effected by spraying water on to the reaction mixture.

38. The process of claim 23 wherein the produced polysuccinimide is hydrolyzed to polyaspartic acid.

39. A polysuccinimide produced by the method of claim 1 and characterized by having a weight average molecular weight of about 200 to about 20,000.

40. A polysuccinimide produced by the process of claim 23 and characterized by having a weight average molecular weight of about 200 to about 20,000.

41. The method of claim 1 further including the step of subsequently depositing said reaction mixture obtained in step (a) onto a plate type reactor before performing step (b).

\* \* \* \* \*